(12) United States Patent
Meredith et al.

(10) Patent No.: US 12,418,775 B2
(45) Date of Patent: Sep. 16, 2025

(54) SYSTEM, APPARATUS, AND METHOD FOR DYNAMIC CHANNELIZATION OF GROUP COMMUNICATIONS

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Zachary Meredith, Roswell, GA (US); Roger Kirk Reese, Jr., Woodstock, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 780 days.

(21) Appl. No.: 17/713,831

(22) Filed: Apr. 5, 2022

(65) Prior Publication Data
US 2023/0319513 A1  Oct. 5, 2023

(51) Int. Cl.
*H04W 4/08* (2009.01)

(52) U.S. Cl.
CPC .................................... *H04W 4/08* (2013.01)

(58) Field of Classification Search
CPC ...................................................... H04W 4/08
See application file for complete search history.

(56) References Cited

U.S. PATENT DOCUMENTS

| | | | | |
|---|---|---|---|---|
| 11,882,164 B1 * | 1/2024 | Siyavudeen | ........ | H04L 65/4061 |
| 2005/0070320 A1 * | 3/2005 | Dent | ...................... | H04W 72/30 455/515 |
| 2006/0229090 A1 * | 10/2006 | LaDue | .................. | H04W 84/04 455/507 |
| 2010/0054218 A1 * | 3/2010 | Clayton | ................ | H04W 8/005 370/338 |
| 2012/0135725 A1 * | 5/2012 | Pinder | ................... | H04W 76/40 455/422.1 |
| 2018/0203442 A1 * | 7/2018 | Kotlyarov | ............... | B64U 20/30 |
| 2021/0365236 A1 * | 11/2021 | Shah | ....................... | G06F 3/165 |

* cited by examiner

*Primary Examiner* — Junpeng Chen
(74) *Attorney, Agent, or Firm* — Guntin & Gust, PLC; Louis Yang

(57) ABSTRACT

Aspects of the subject disclosure may include, for example, an end-user device comprising: a processing system including a processor; and a memory that stores executable instructions that, when executed by the processing system, facilitate performance of operations, the operations comprising: storing for each other end-user device of a plurality of other end-user devices a respective identification, the end-user device and the plurality of other end-user devices forming a group; receiving a first indication of a first subset of the group with which to carry out first communications, the first subset comprising one or more first target end-user devices selected from the group; responsive to receipt of the first indication, sending to each of the one or more first target end-user devices a first instruction to communicate with the end-user device via a first dynamically determined channel; and engaging in the first communications with each of the one or more first target end-user devices after each of the one or more first target end-user devices has tuned to the first dynamically determined channel. Other embodiments are disclosed.

20 Claims, 11 Drawing Sheets

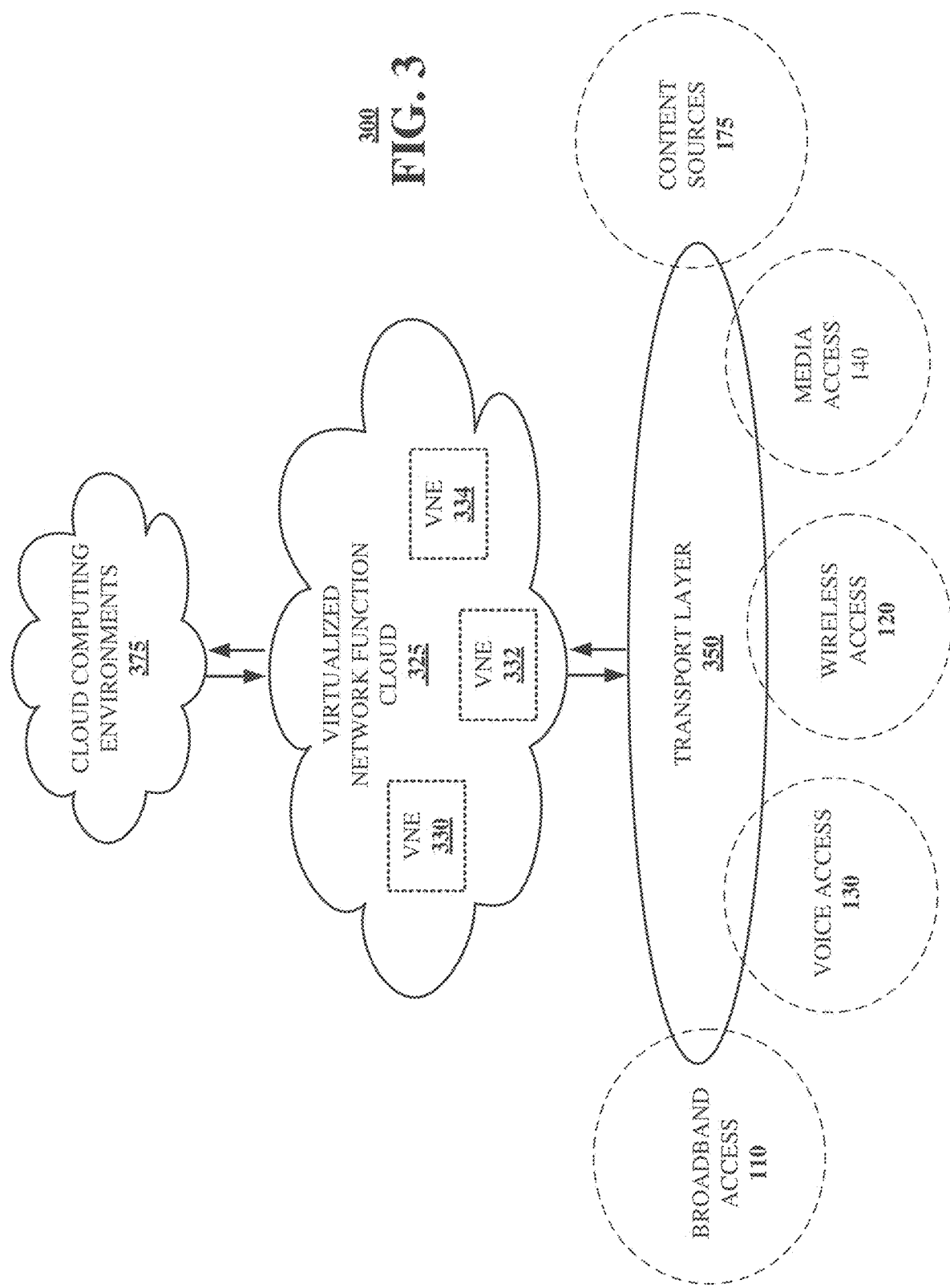

SYSTEM, APPARATUS, AND METHOD FOR DYNAMIC CHANNELIZATION OF GROUP COMMUNICATIONS

FIELD OF THE DISCLOSURE

The subject disclosure relates to a system, apparatus, and method for dynamic channelization of group communications.

BACKGROUND

Certain conventional simple systems such as 2-way radio provide channelization, wherein anyone could listen or talk on any one channel, but there is typically no mechanism to automatically and dynamically move between channels. Also, there is typically no mechanism to automatically connect to another user or group of listeners without knowing which channel they are camping on. Further, if someone is monitoring an individual channel, there is typically no mechanism for also automatically monitoring other channels. Thus, such conventional systems would typically inhibit group or sub-group communications and would typically not allow every person to automatically dynamically connect to other individuals or sub-groups.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
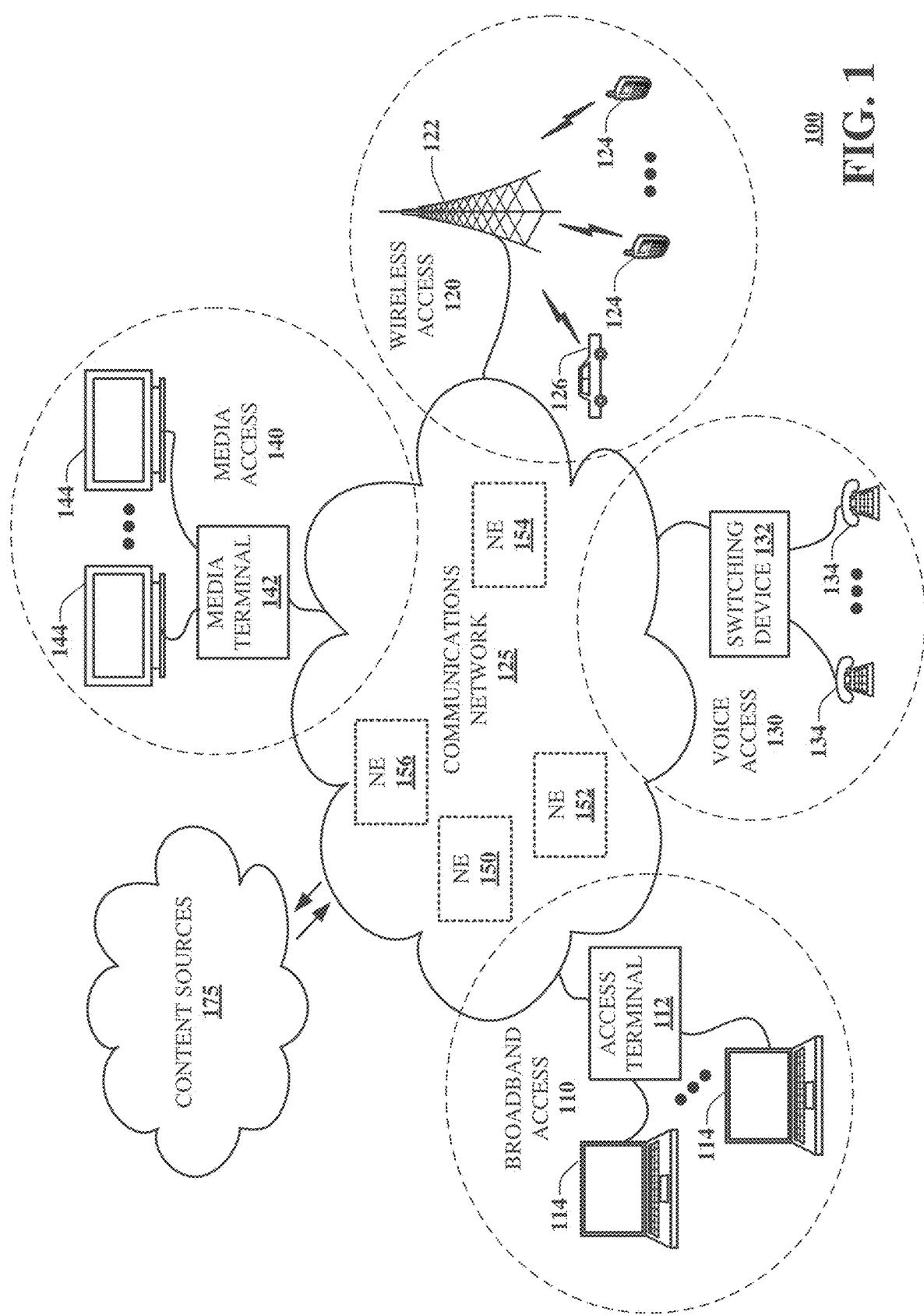
FIG. 1 is a block diagram illustrating an example, non-limiting embodiment of a communication network in accordance with various aspects described herein.

The subject disclosure describes, among other things, illustrative embodiments for dynamic channelization of group communications. Other embodiments are described in the subject disclosure.

Various embodiments can provide for secure and dynamic re-channelization of simultaneous communications between members of a group (e.g., using voice-activated and/or manual device interaction). Multiple communication channels can be dynamically and simultaneously active within a prescribed bandwidth where each channel is dynamically created and used between a single speaker and one or more listeners of the group. Various embodiments possess the joint attributes of one-to-one calls, three-way calls, large group broadcasts, push to talk services, and more where channelization can be arbitrarily defined and activated such as by voice command during high intensity scenarios. Various embodiments do not require the presence of a cellular network, enhancing the usefulness of the mechanism. Various embodiments provide for each independent communication within the prescribed bandwidth allocation to be encrypted and private.

One or more aspects of the subject disclosure include an end-user device comprising: a processing system including a processor; and a memory that stores executable instructions that, when executed by the processing system, facilitate performance of operations, the operations comprising: storing for each other end-user device of a plurality of other end-user devices a respective identification, the end-user device and the plurality of other end-user devices forming a group; receiving a first indication of a first subset of the group with which to carry out first communications, the first subset comprising one or more first target end-user devices selected from the group; responsive to receipt of the first indication, sending to each of the one or more first target end-user devices a first instruction to communicate with the end-user device via a first dynamically determined channel; and engaging in the first communications with each of the one or more first target end-user devices after each of the one or more first target end-user devices has tuned to the first dynamically determined channel.

One or more aspects of the subject disclosure include a non-transitory machine-readable medium comprising executable instructions that, when executed by a processing system of an end-user device including a processor, facilitate performance of operations, the operations comprising: obtaining for each other end-user device of a plurality of other end-user devices respective identification information, the plurality of other end-user devices and the end-user device together forming a group; obtaining first information indicating that one or more first end-user devices of the plurality of other end-user devices belongs to a first sub-group; obtaining second information indicating that one or more second end-user devices of the plurality of other end-user devices belongs to a second sub-group; receiving a first verbal command, the first verbal command indicating that first communications are to be carried out with the one or more first end-user devices of the first sub-group; responsive to receipt of the first verbal command, transmitting to each of the one or more first end-user devices of the first sub-group third information, the third information directing each of the one or more first end-user devices of the first sub-group to communicate with the end-user device via a first portion of wireless spectrum that is dynamically assigned; receiving a second verbal command, the second verbal command indicating that second communications are to be carried out with the one or more second end-user devices of the second sub-group; and responsive to receipt of the second verbal command, transmitting to each of the one or more second end-user devices of the second sub-group fourth information, the fourth information directing each of the one or more second end-user devices of the second sub-group to communicate with the end-user device via a second portion of wireless spectrum that is dynamically assigned, the second portion of wireless spectrum being distinct from the first portion of wireless spectrum.

One or more aspects of the subject disclosure include a method, comprising: obtaining, by a mobile device comprising a processing system including a processor, data indicating that one or more first transceivers of a plurality of transceivers belongs to a first sub-group and that one or more second transceivers of the plurality of transceivers belongs to a second sub-group; responsive to receipt of a first command from a user of the mobile device, transmitting by the processing system to each transceiver of the first sub-group a first communication instruction, the first communication instruction directing each transceiver of the first sub-group to communicate with the mobile device via a first portion of wireless spectrum that is dynamically assigned; responsive to receipt of a second command from the user of the mobile device, transmitting by the processing system to each transceiver of the second sub-group a second communication instruction, the second communication instruction directing each transceiver of the second sub-group to communicate with the mobile device via a second portion of wireless spectrum that is dynamically assigned, the second portion of wireless spectrum being distinct from the first portion of wireless spectrum; engaging in first communications with each transceiver of the first sub-group after each transceiver of the first sub-group has enabled communication via the first portion of wireless spectrum; and engaging in second communications with each transceiver of the second sub-group after each transceiver of the second sub-group has enabled communication via the second portion of wireless spectrum.

Referring now to FIG. 1, a block diagram is shown illustrating an example, non-limiting embodiment of a system 100 in accordance with various aspects described herein. For example, system 100 can facilitate in whole or in part dynamic channelization of wireless communications such that one user of a group of users can automatically communicate bi-directionally with one or more other users that form a subset of the group. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
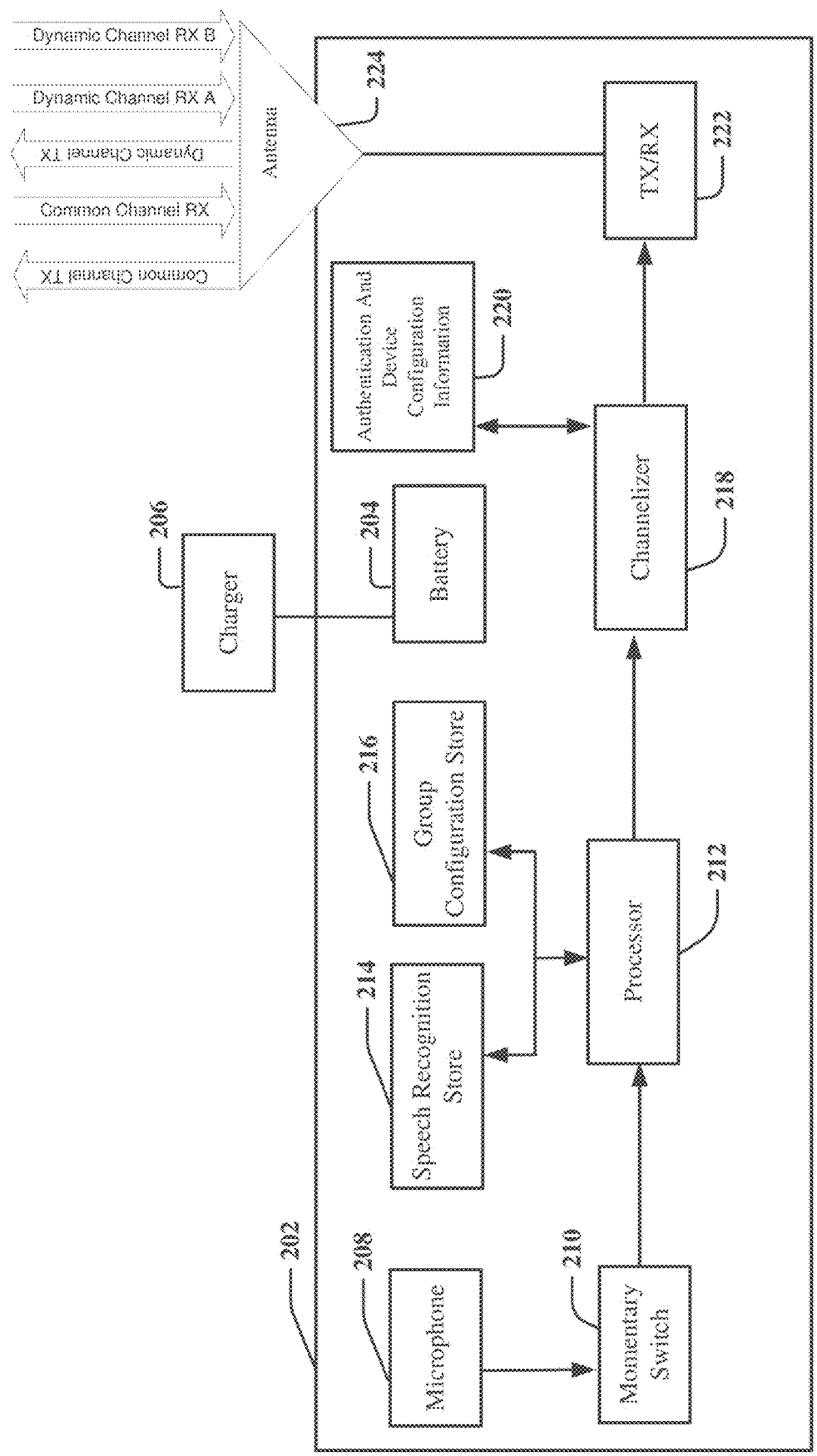
FIG. 2A is a block diagram illustrating an example, non-limiting embodiment of a system (which can function fully or partially within the communication network of FIG. 1) in accordance with various aspects described herein.

Referring now to FIG. 2A, this is a block diagram illustrating an example, non-limiting embodiment of a system 200 (which can function fully or partially within the communication network of FIG. 1) in accordance with various aspects described herein. As seen in this figure, system 200 can include device 202. In various examples, device 202 can be a body-worn device (e.g., strapped to the body, held in a pocket, attached to a helmet), a hand-held device, a vehicle-mounted device (e.g., in a passenger compartment of a car, a truck, or other vehicle; in a cockpit of an airplane or helicopter; in a dashboard of a vehicle), or any combination thereof. Further, device 202 can include battery 204 (which can be recharged via charger 206). In addition, device 202 can include microphone 208 and momentary switch 210. In various examples, the momentary switch 210 can include a manual lock mechanism. Moreover, device 202 can include processor 212, speech recognition store 214 (which can store, for example, data to enable recognizing speech of particular users), and group configuration store 216 (which can store, for example, data defining group membership (e.g., the identities of particular people in each group and/or subgroup)). Further, device 202 can include channelizer 218 and authentication and device configuration information 220 (which can include, for example, data to enable authentication of particular users and a device configuration associated with each user). Finally, device 202 can include transmitter/receiver (TX/RX) 222 and antenna 224. The antenna 224 can enable communications with various other device(s) as described herein. In one specific example, the antenna can facilitate the following channels: Common Channel TX (outgoing); Common Channel RX (incoming); Dynamic Channel TX (outgoing); Dynamic Channel RX A (incoming channel "A"); and Dynamic Channel RX B (incoming channel "B").

Reference will now be made to operation of system 200 of FIG. 2A according to an embodiment. In one example, device 202 can participate in secure (encrypted) group communications with other similar or identical devices. Device 202 (and the other similar or identical devices) can have several general characteristics as follows.

1. Each device has a unique electronic identifier.
2. Each device is aware of all other members of the secure device group.
3. Each device is assigned a callable name (e.g., the name or call sign of the respective device holder).
4. Each device has a microphone (see, e.g., element 208) and can act on voice commands.
5. Each device has a momentary switch (see, e.g., element 210) which activates the microphone. The momentary switch can also be set to an ON state in which case the microphone stays on.
6. When the microphone is on, an audio receiver and processor (see, e.g., element 212) can interpret voice commands to dynamically establish communications with individuals and/or groups by call sign. For instance, there can be a device held by "Eastwood" who presses the momentary switch and then says "zebra, Huggybear, look out behind you." In this case, zebra may be a keyword telling the transceiver to establish a communication channel between the device and all devices associated with Huggybear. If Huggybear is associated with one device, a dynamic radio channel is established for one-way communication to that device.
7. The device belonging to Eastwood uses a common group channel to notify the device belonging to Huggybear about an incoming communication and to go to logical channel X where X is defined within the radio bandwidth being used by the group of radios, but having spread-spectrum coding that will provide separation between the communication and other simultaneous communications.
8. The Hubbybear device uses the spread spectrum coding properties for channel X to monitor and await communications from the device belonging to Eastwood. The listener with the Huggybear device hears audio output along the lines of "Eastwood . . . Look out behind you." The word Eastwood may be a computer generated version of the word or may be a digital representation of the voice of Eastwood. Either way, Huggybear knows the incoming communication is from Eastwood who is saying "look out behind you."
9. Immediately after the communication is delivered, the logical channel X is terminated. The creation, use, and termination of the logical channel is not limited to a single channel. Several such channels can co-exist. Further, if the communication is from one to multiple devices, each device listener hears the same message. To communicate with a group of devices, Eastwood may need to press the momentary switch and say "zebra, Team A, move in." Team A is defined on Eastwood's device. The Eastwood device uses the common channel to notify all associated devices about logical channel Y which can be simultaneously monitored by all of them. When channel Y is terminated, subsequent communications require dynamic establishment of more channels.
10. Every device can dynamically contact every other device in the group or sub-group of devices so long as the sub-group is defined as a set of devices within the group.
11. If the momentary switch is forced to an always-on state, it allows the device holder to still activate communications using the keyword such as zebra, but constant activation of the microphone may cause higher battery drain. This would be similar to police officers that activate the AXON video cameras only when they need to. In this case, a microphone receiver causes a fairly low battery drain.

Figure 2B:
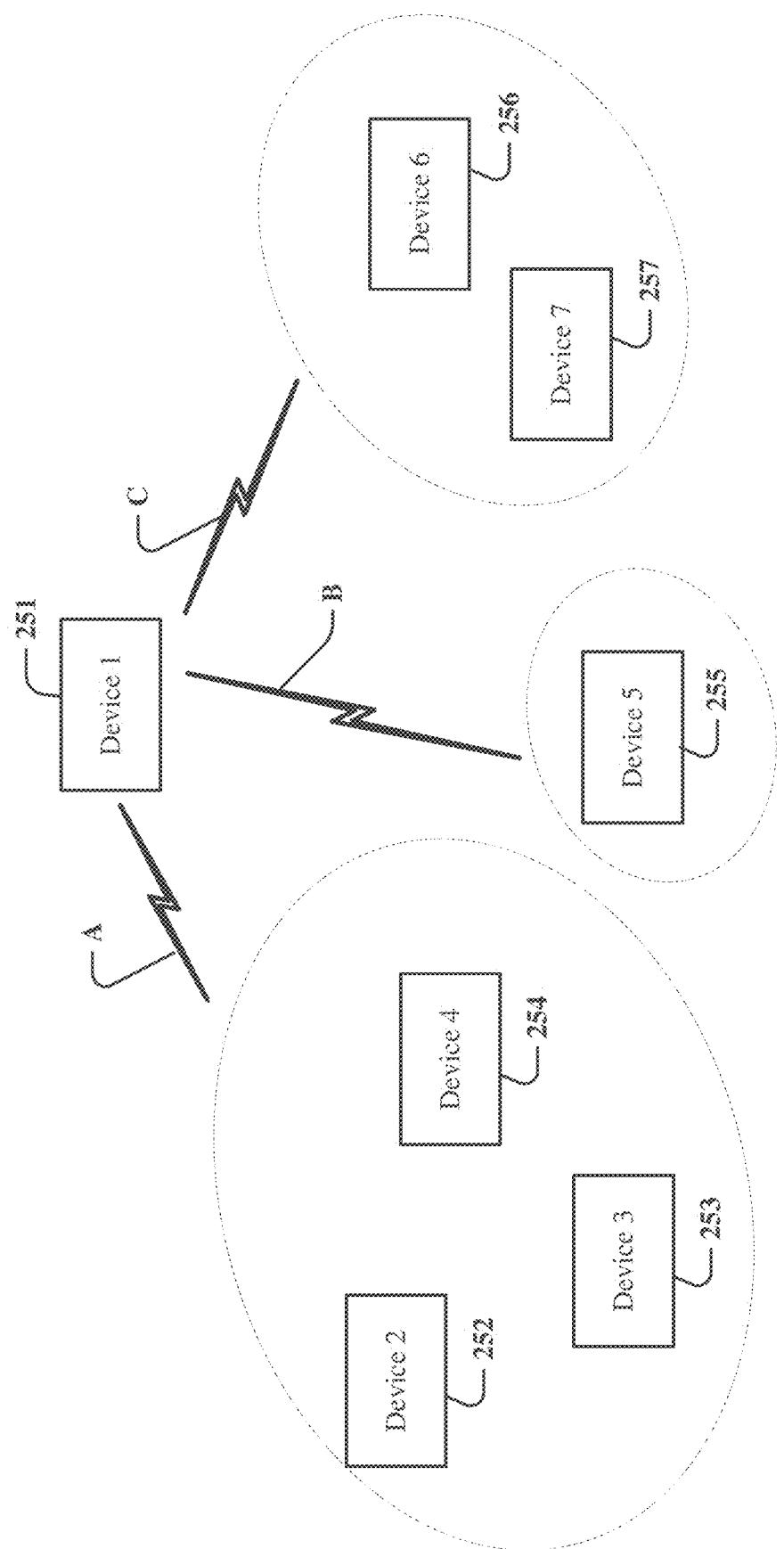
FIG. 2B is a block diagram illustrating an example, non-limiting embodiment of a system (which can function fully or partially within the communication network of FIG. 1) in accordance with various aspects described herein.

Referring now to FIG. 2B, this is a block diagram illustrating an example, non-limiting embodiment of a system 250 (which can function fully or partially within the communication network of FIG. 1) in accordance with various aspects described herein. As seen in this figure, element 251 (Device 1) is configured for wireless bidirectional communications with each of elements 252-257 (devices 2-7, respectively). Each of elements 251-257 of this figure can be the same or similar to device 202 of FIG. 2A. In this example, all of elements 251-257 are part of a total group. Further: sub-group A includes Device 1 along with Devices 2, 3, and 4; sub-group B includes Device 1 along with Device 5; and sub-group C includes Device 1 along with Devices 6 and 7. Of course, the number of sub-groups and the number of devices in each sub-group are given as examples only, and any desired number of sub-groups and constituent number of devices can be used. In any case, Device 1 can communicate (as described herein) via channel "A" with each other member of sub-group A (i.e., Devices 2, 3, 4). Further, Device 1 can communicate (as described herein) via channel "B" with each other member of sub-group B (i.e., Device 5). Further still, Device 1 can communicate (as described herein) via channel "C" with each other member of sub-group C (i.e., Devices 6 and 7). In various examples, each of Devices 1-7 can be an end-user device (for instance, an end-user transceiver).

Reference will now be made to another example operation according to an embodiment. In this embodiment, devices (see, e.g., Device 202 of FIG. 2A and the Devices 1-7 of system 250 of FIG. 2B) must first be established as member of a group (see, for example, all of Devices 1-7 of system 250 of FIG. 2B). This can be accomplished with a computer where each device and its user's call-sign are asserted. For instance, device 2FFCDEDF25FA may be associated with user "HuggyBear". Additionally, sub-group call-signs can be defined with all of the devices belonging to the particular sub-group (see, for example: sub-group A (Devices 1-4) of FIG. 2B; sub-group B (Devices 1 and 5 of FIG. 2B); and sub-group C (Devices 1, 6, and 7) of FIG. 2B). Further, a whole-group call-sign is defined with the total set of devices (see, for example, all of the devices of system 250 of FIG. 2B). The call-signs can be provided to each device via any one or many secure communication mechanisms including, but not limited to, wired connection, peer to peer wireless connection, or secure local area networks.

In operation, voice activation can be one mechanism by which to dynamically invoke a communication between the invoking device and the prescribed call-sign (which can correspond, for example, to a single device or to a sub-group). In one example, a device can be trained to recognize its owner's (or user's) voice for each of the call-signs used for the entire group. This can be accomplished, for example, via functionality wherein each user is prompted by a respective device to speak certain call-signs. The device microphone can be able to record the voice pattern for each call-sign and retain it in a local memory store (see, e.g., element 214 of FIG. 2A).

Further, even when a device is sending or receiving a communication, the device can continually monitor the common channels and can be informed of another inbound communication. In one example, the device would be able to simultaneously receive communications on more than one logical channel. In the event of simultaneous communication demands, a communication can be queued for delivery after a first message is terminated. In this event, the sender of a queued message can receive an indicator notifying him or her that the sent message has not yet been played at all receiving devices. Upon such delayed messages being played, a confirmation message can also be provided to the sender. In some cases, it may be critical to ensure all parties to the communication had it played on their device. Thus, in various examples, listeners to a message can be able to manually and/or verbally confirm receipt of a communication which can further result in a message back to the sender that all receivers acknowledge receipt of it. For instance, say that Bill is sending a message to Mike and Sally sends a message to Team A which includes Mike. Mike's device is being double tasked, but with two logical receivers, it receives both messages. However, Mike can only listen to one at a time. Mike's device sends a message over the common channel back to Sally's device indicating receipt of a message that has not yet been played. Sally's device plays a warning tone and can even "say" which device didn't get the message (e.g., if it was only one device). In one example, if more than one device, then the warning tone would not be proceeded by a name or call-sign which would imply multiple devices failed to play the message. After the messages are played by those same devices, messages over the common channel back to Sally's device clear a temporary buffer and when the buffer is completely clear, a different tone or sound can be played to Sally which notifies her that all receiving devices have now played the message to their holders/users. For safety reasons, this confirmation of playing (not just receiving) can be important. For similar reasons, various embodiments can require positive confirmation from the listeners (knowing for sure that everyone heard a message could be very important).

In various embodiments, when simultaneous messages occur, generally the first one arriving will take priority. However, in the event of an emergency communication requiring priority, a keyword could be used that tells all receiving devices to interrupt any current audio play with the emergency message. There could also be a priority for senders such that some senders' messages always take priority. For instance, priority can always be given to foreman on a job site, to a squad leader for the police, or a squad leader for a military team.

In various embodiments, the frequency channel over which these communication devices operate can be configurable as a parameter within the operational capability of the one or more antennas embedded or connected to the respective device. Individual communication channels within the common bandwidth for the group can be separated by spread spectrum code, but can also have independent encryption to prevent eavesdropping by non-group parties (though perhaps not required, such encryption could also prevent members of the group who are not parties to a communication channel from eavesdropping).

In various embodiments, the spread-spectrum coding scheme can prevent communication jamming. In various examples, the ratio of the common channel bandwidth to the coded-voice bandwidth represents the available coding gain. For instance, assume the common channel bandwidth is 100 MHz and the coded-voice bandwidth is 5.9 KHz (a common codec used for UMTS). The ratio is 16949 which corresponds to $10*\log(16949)=42.29$ dB of coding gain which can also be thought of as protecting against jamming. It is possible to increase protection from jamming by using frequency hopping with jammer avoidance to effectively filter out jammer frequencies.

Figure 2C:
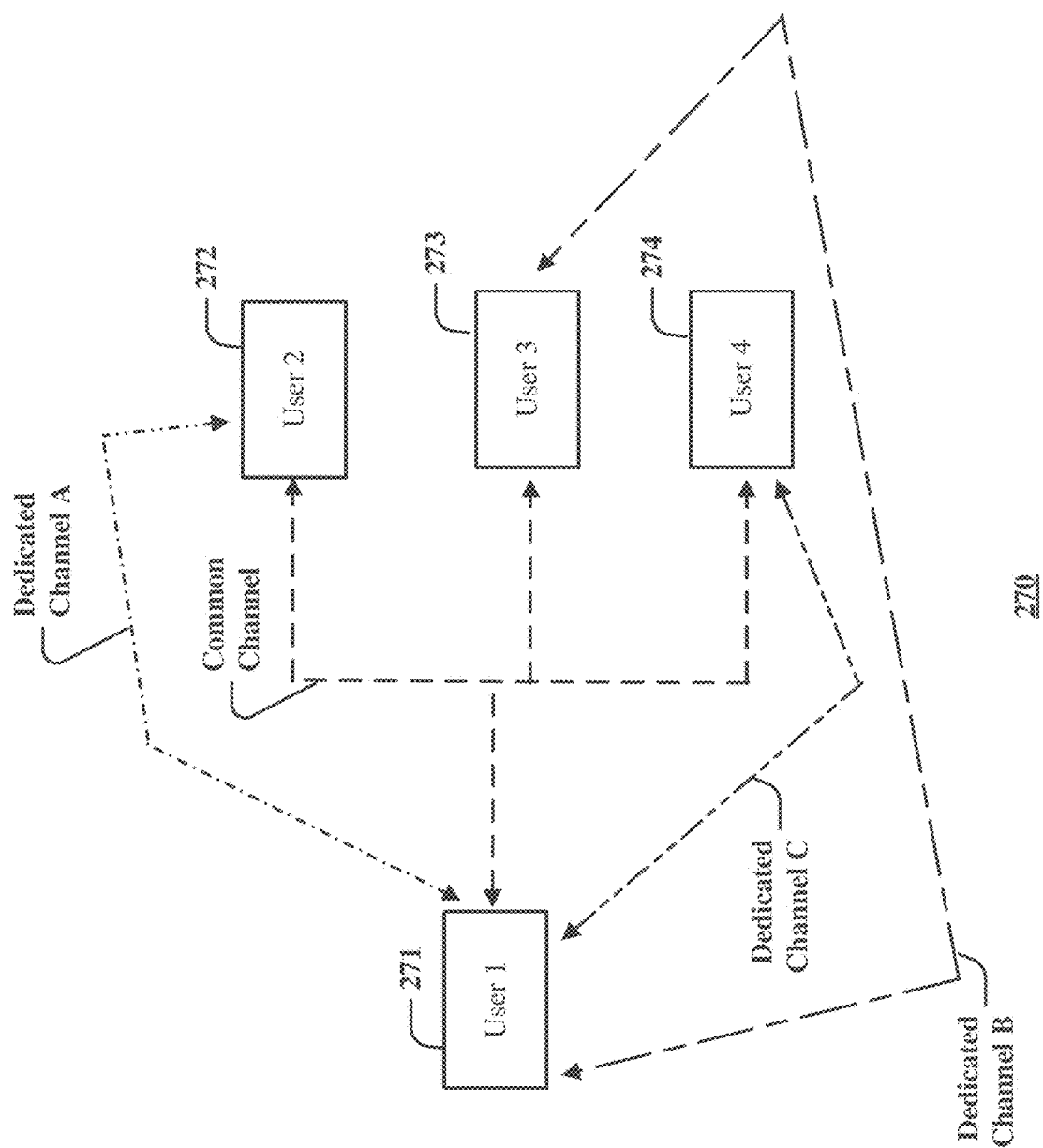
FIG. 2C is a block diagram illustrating an example, non-limiting embodiment of a system (which can function fully or partially within the communication network of FIG. 1) in accordance with various aspects described herein.

Referring now to FIG. 2C, this is a block diagram illustrating an example, non-limiting embodiment of a system 270 (which can function fully or partially within the communication network of FIG. 1) in accordance with various aspects described herein. As seen in this figure, User 1, User 2, User 3, and User 4 are using the system in this example. Each of the users can be using a respective communication device (not shown) of the type depicted in FIG. 2A. User 1 can communicate with User 2 via a separate dedicated wireless Channel "A", User 1 can communicate with User 3 via a separate dedicated wireless Channel "B", and User 1 can communicate with User 4 via a separate dedicated wireless Channel "C". In addition, a Common Channel can be provided. This Common Channel can be used to provide instructions (such as which channel to dynamically tune to) and/or notifications (such as "delivery receipts", "listen receipts") as described herein.

Reference will now be made to a number of example applications where there would be use for limited communications within sub-groups rather than group-wide communications. More particularly, various embodiments can facilitate:

Example Application 1—Assume a ship's crew with 100 members. One crew sub-group is dealing with propulsion systems while another sub-group is dealing with navigation. Typically, these sub-groups would not need to communicate across both sub-groups. However, there may be some messages that actually need to go to the entire crew. Dynamically established communication may, for example, need to only be between two individuals or from one individual to a set of individuals. Each of these dynamically established communications is referred to for the purpose of this discussion as a channel. In one example, these channels may only be used once, are therefore transient, and do not need to be predefined (under certain circumstances such predefinition would be an inefficient use of radio spectrum). Various embodiments can provide multiple, simultaneous one-to-one communications. Various embodiments can provide one to one communications simultaneously with one to many communications. Various embodiments can facilitate a person rapidly and frequently shifting between communications with one individual to another individual and/or to a sub-group.

Example Application 2—A construction crew may utilize various embodiments. For example, while using heavy equipment, targeted communication with specific individuals may be required for safety reasons (e.g., where group communications over a common channel may not suffice and may even cause confusion and/or danger). In one specific example, a construction boss may need to send a communication to everyone, to a sub-group, and/or to just one individual (and time may be of the essence). Looking up and dialing a number may not suffice. In another specific example, if one team member spots danger to another crew member and cannot yell out over site noise, a targeted communication in real-time could be best.

Example Application 3—Yet another use-case is on a battlefield or a police action in which a leader may need to send a specific communication to one person and not the entire team. While one communication is occurring, another communication channel between different parties in the same group may be needed. Traditionally, this is not possible with a single, common communication channel (the concept of saying "over" when speaking on a common channel is so others know when they might speak; in addition, with traditional common communication channels, multiple people can try to seize the common channel simultaneously which then inhibits communications completely—this is the notion of "walking on each other.").

Figure 2D:
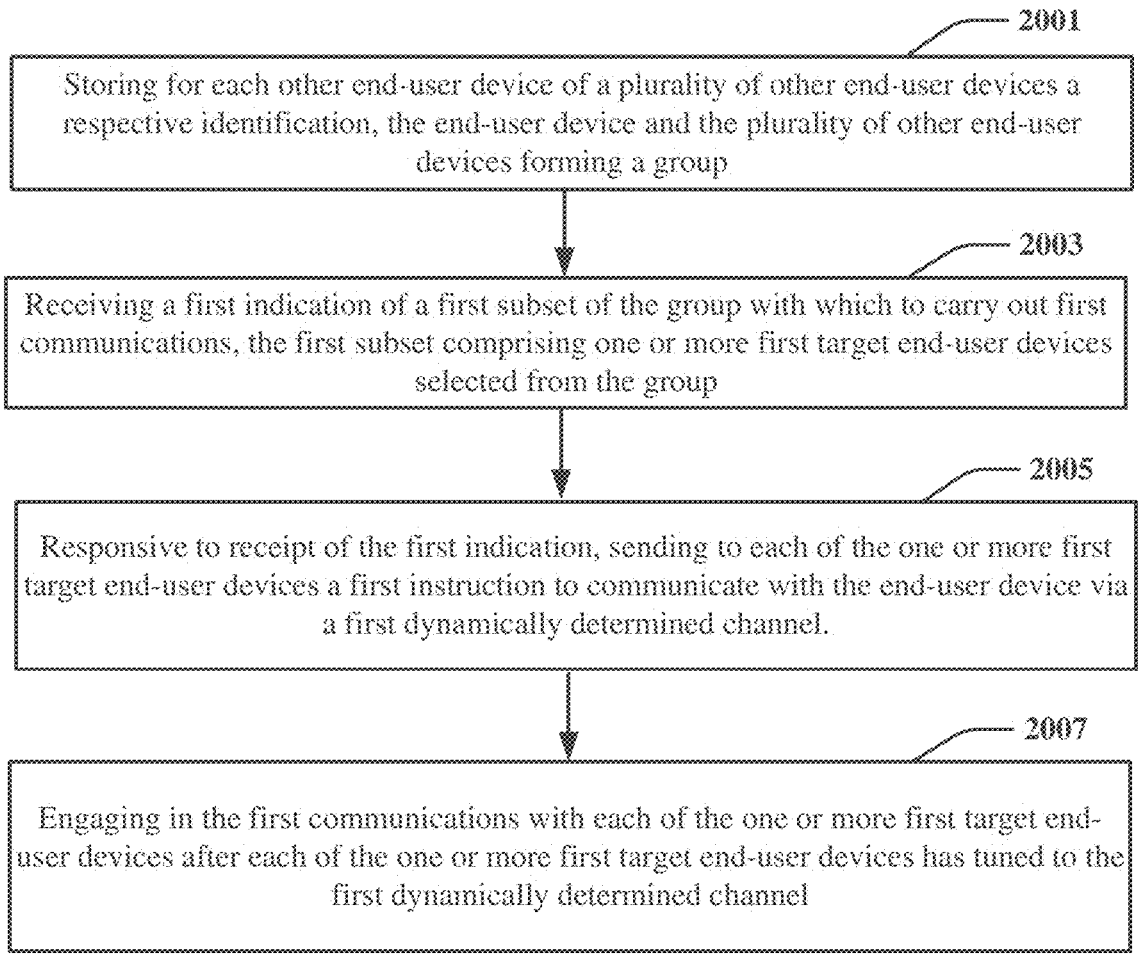
FIG. 2D depicts an illustrative embodiment of a method in accordance with various aspects described herein.

Referring now to FIG. 2D, various steps of a method 2000 (which can be carried out by an end-user device) according to an embodiment are shown. As seen in this FIG. 2D, step 2001 comprises storing for each other end-user device of a plurality of other end-user devices a respective identification, the end-user device and the plurality of other end-user devices forming a group. Next, step 2003 comprises receiving a first indication of a first subset of the group with which to carry out first communications, the first subset comprising one or more first target end-user user devices selected from the group. Next, step 2005 comprises responsive to receipt of the first indication, sending to each of the one or more first target end-user devices a first instruction to communicate with the end-user device via a first dynamically determined channel. Next, step 2007 comprises engaging in the first communications with each of the one or more first target end-user devices after each of the one or more first target end-user devices has tuned to the first dynamically determined channel.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
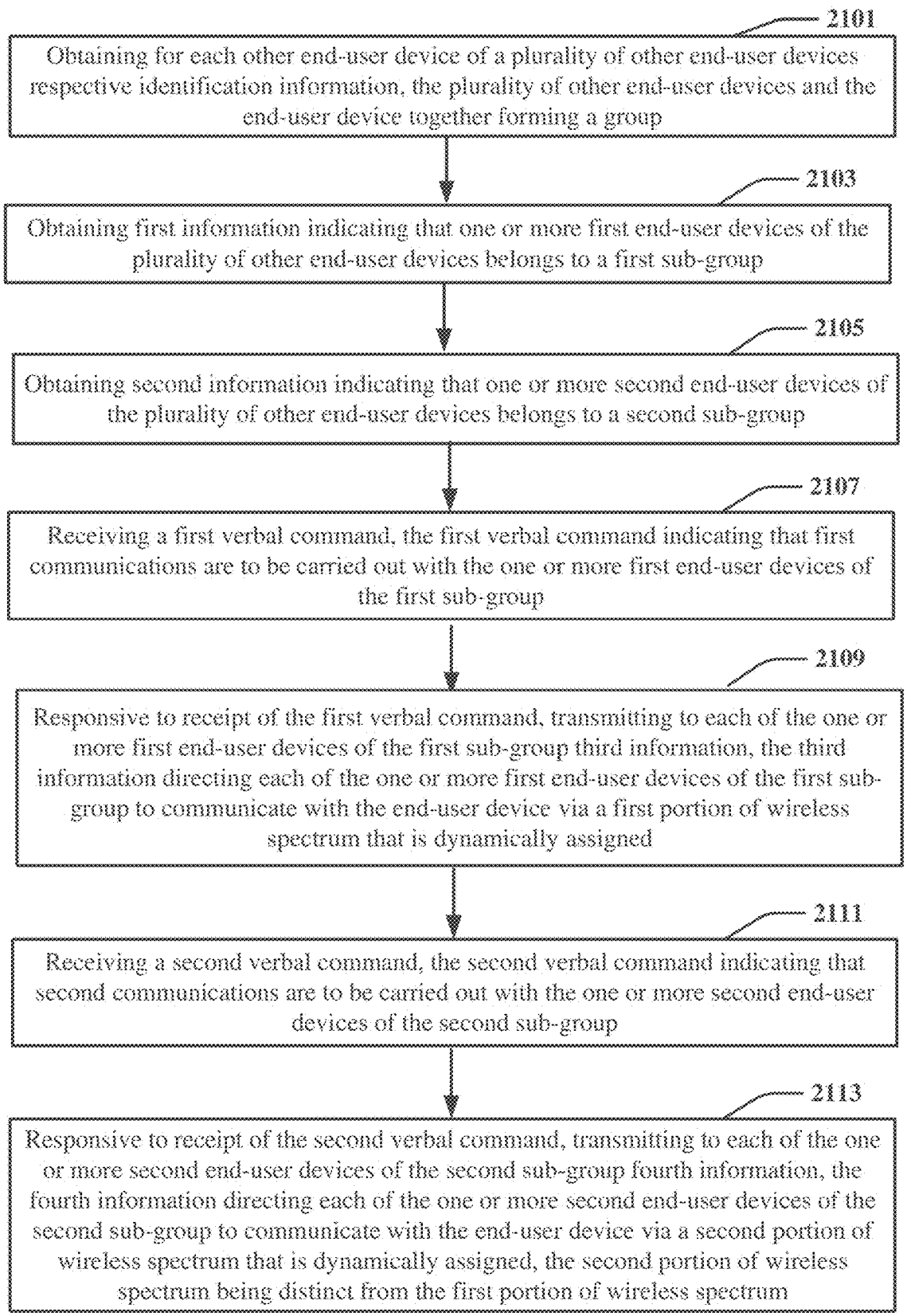
FIG. 2E depicts an illustrative embodiment of a method in accordance with various aspects described herein.

Referring now to FIG. 2E, various steps of a method 2100 (which can be carried out by an end-user device) according to an embodiment are shown. As seen in this FIG. 2E, step 2101 comprises obtaining for each other end-user device of a plurality of other end-user devices respective identification information, the plurality of other end-user devices and the end-user device together forming a group. Next, step 2103 comprises obtaining first information indicating that one or more first end-user devices of the plurality of end-user devices belongs to a first sub-group. Next, step 2105 comprises obtaining second information indicating that one or more second end-user devices of the plurality of end-user devices belongs to a second sub-group. Next, step 2107 comprises receiving a first verbal command, the first verbal command indicating that first communications are to be carried out with the one or more first end-user devices of the first sub-group. Next, step 2109 comprises responsive to receipt of the first verbal command, transmitting to each of the one or more first end-user devices of the first sub-group third information, the third information directing each of the one or more first end-user devices of the first sub-group to communicate with the end-user device via a first portion of wireless spectrum that is dynamically assigned. Next, step 2111 comprises receiving a second verbal command, the second verbal command indicating that second communications are to be carried out with the one or more second end-user devices of the second sub-group. Next, step 2113 comprises responsive to receipt of the second verbal command, transmitting to each of the one or more second end-user devices of the second sub-group fourth information, the fourth information directing each of the one or more second end-user devices of the second sub-group to communicate with the end-user device via a second portion of wireless spectrum that is dynamically assigned, the second portion of wireless spectrum being distinct from the first portion of wireless spectrum.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
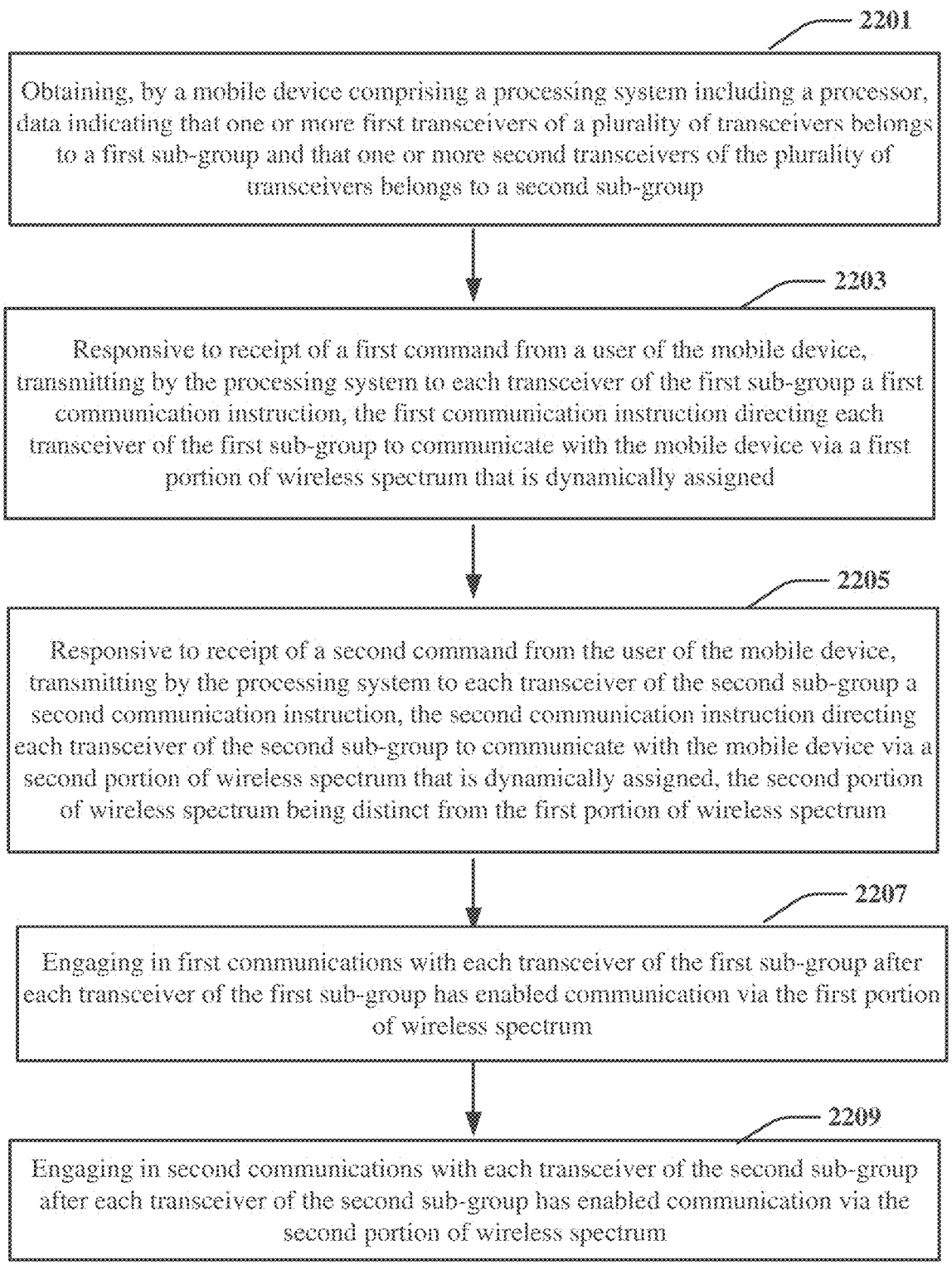
FIG. 2F depicts an illustrative embodiment of a method in accordance with various aspects described herein.

Referring now to FIG. 2F, various steps of a method 2200 according to an embodiment are shown. As seen in this FIG. 2F, step 2201 comprises obtaining, by a mobile device comprising a processing system including a processor, data indicating that one or more first transceivers of a plurality of transceivers belongs to a first sub-group and that one or more second transceivers of the plurality of transceivers belongs to a second sub-group. Next, step 2203 comprises responsive to receipt of a first command from a user of the mobile device, transmitting by the processing system to each transceiver of the first sub-group a first communication instruction, the first communication instruction directing each transceiver of the first sub-group to communicate with the mobile device via a first portion of wireless spectrum that is dynamically assigned. Next, step 2205 comprises responsive to receipt of a second command from the user of the mobile device, transmitting by the processing system to each transceiver of the second sub-group a second communication instruction, the second communication instruction directing each transceiver of the second sub-group to communicate with the mobile device via a second portion of wireless spectrum that is dynamically assigned, the second portion of wireless spectrum being distinct from the first portion of wireless spectrum. Next, step 2207 comprises engaging in first communications with each transceiver of the first sub-group after each transceiver of the first sub-group has enabled communication via the first portion of wireless spectrum. Next, step 2209 comprises engaging in second communications with each transceiver of the second sub-group after each transceiver of the second sub-group has enabled communication via the second portion of wireless spectrum.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide a mechanism to rapidly establish communication channel(s) to any one person or group of persons and have the process automatically handled by both ends of the communication.

As described herein, various embodiments can replace certain cellular-like systems (which, in some scenarios, may not be available; this could occur in a wide variety of worldwide locations, at sea, in mountainous terrain, in rural areas, and/or during major power outages).

As described herein, various embodiments can replace certain cellular-like systems by facilitating dynamic channelization.

As described herein, various embodiments can implement spread spectrum using direct sequence coding and/or frequency hopping.

As described herein, various embodiments can be used for consumer, commercial, and/or governmental applications.

As described herein, a system, apparatus and method provide a communications capability for groups of individuals (in various examples, the communications capability can be provided in cases where no cellular services exist and 2-way radio communications are ineffective for required communications). Various embodiments provide features that can dynamically behave like cellular mobile to mobile communications, three-way mobile communications, and push-to-talk dispatch communications while also providing for simultaneity of all these and more communication types separated by spread spectrum coding in a common bandwidth. Such spread spectrum coding can make each communication difficult to electronically jam, ensuring robustness of communications. Each communication logical channel within the common bandwidth can be further robustly encrypted to prevent eavesdropping.

As described herein, various embodiments can provide for dynamic selection of logical channels and/or dynamic selection of devices with which to communicate.

As described herein, various embodiments can provide for selection of a person with whom communication is desired (in various examples, the selection can be spoken and/or indicated by pushbutton).

As described herein, various embodiments can provide for dynamically establishing a logical communication channel (such as by spoken indication and/or pushbutton) and sending a notice identifying the logical communication channel to one or more target devices over a common communication channel. In response to the notice, the one or more target devices can tune to the logical communication channel.

As described herein, various embodiments can provide for mapping of users' names (and/or nicknames) to hardware devices (e.g., transceivers). In one example, the mappings can be pre-defined and can be known by all devices operating in the system (e.g., all transceivers).

As described herein, various embodiments can provide for a given transceiver to associate a particular output sound (e.g., beep of a particular frequency) with a particular incoming message (e.g., a particular incoming message from a particular user).

As described herein, various embodiments can provide for release of a dynamically established logical communication channel (e.g., release of a dynamically established logical communication channel at both endpoints of a given communication).

As described herein, various embodiments can provide for monitoring one or more dedicated channels and/or monitoring one or more common channels.

As described herein, various embodiments can provide for one or more indicators that indicate received messages and/or played (output) messages. In one example, if a delivery receipt is not received within a threshold time, an alert can be sent to the sender (that is, to the sender's device). In one example, if a played receipt is not received within a threshold time, an alert can be sent to the sender (that is, to the sender's device). In various examples, an alert can be output in audio form (e.g., beep, spoken words) and/or output in visual form (e.g., red light, yellow light, green light). In one specific example, an indicator mechanism (e.g., a light) of an originating device can default to red, then turn yellow to indicate that a message was received by a target device, and then turn green to indicate that the message was played by the target device to a user of the target device. In one example, the originating device can output a beep or the like if a message is not received by a target device within a threshold time and/or if a message is not output by the target device to its user within a threshold time.

As described herein, various embodiments can provide for a repeater system (e.g., using a proxy device). In one example, one or more devices such as described herein (e.g., a transceiver) can operate as a repeater to receive a message from one device and forward the message to another device (thus, for example, extending a communication range). In one example, the repeater can operate to establish the equivalent of a local area network. In one example, the repeater can boost a signal.

As described herein, various embodiments can provide for a device (e.g., a transceiver) that can be body-worn, disposed in a building, disposed in a vehicle (e.g., in a cab or passenger compartment), located in a vehicle dashboard, mounted on a helmet, held in a satchel or the like, located on a desktop, worn on a belt, or any combination thereof.

As described herein, various embodiments can provide for a device (e.g., a transceiver) that uses unique keys for communication security.

As described herein, various embodiments can provide for preceding a communication with a directive component in order to target an individual or a subgroup or an entire group of devices that are programmed to interact with the initiating device.

As described herein, various embodiments can provide for tuning to a frequency and/or tuning to a particular digital communication subchannel (e.g., a logically defined channel within a spread spectrum communication on a physical frequency channel).

As described herein, various embodiments can provide for directing a target device to tune to a particular logical channel and/or to tune to a particular frequency.

As described herein, various embodiments can provide for simultaneous communications between a plurality of originating devices and one or more respective target devices.

As described herein, various embodiments can provide for a target device to have multiple receiving channels operating in parallel (e.g., for simultaneously receiving messages from a plurality of originating devices).

As described herein, various embodiments can provide for each dedicated channel to be encrypted and/or for a common channel to be encrypted.

As described herein, in certain situations when individuals in a group need to securely communicate with each other, it may not be necessary for every person to communicate with every other person in the group all of the time. Certain conventional examples of everyone talking to everyone would be dispatch radio services or walkie-talkies. Especially with large groups of individuals in rapidly-evolving situations, the totality of communications carried by such conventional mechanisms could result in overwhelming audio content (which may obviate effective communications). For example, imagine the confusion when 20, 30, or 40 members of a group are trying to use conventional walkie-talkies during an intense situation. Various embodiments provide mechanisms to improve such communications.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, some or all of the subsystems and functions of system 200, some or all of the subsystems and functions of system 250, some or all of the subsystems and functions of system 270, some or all of the functions of method 2000, some or all of the functions of method 2100, and/or some or all of the functions of method 2200. For example, virtualized communication network 300 can facilitate in whole or in part dynamic channelization of wireless communications such that one user of a group of users can automatically communicate bi-directionally with one or more other users that form a subset of the group.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
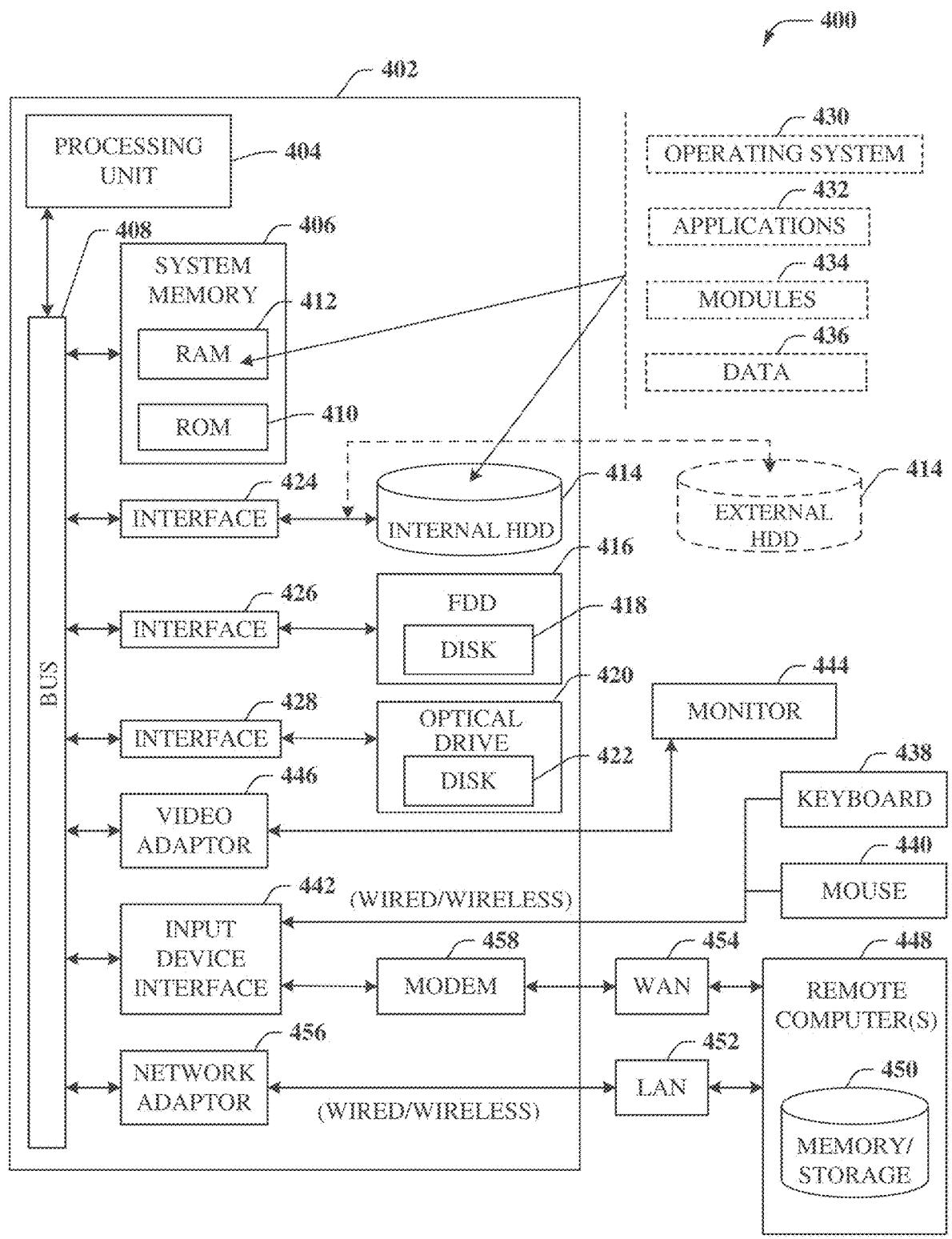
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamic channelization of wireless communications such that one user of a group of users can automatically communicate bi-directionally with one or more other users that form a subset of the group.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
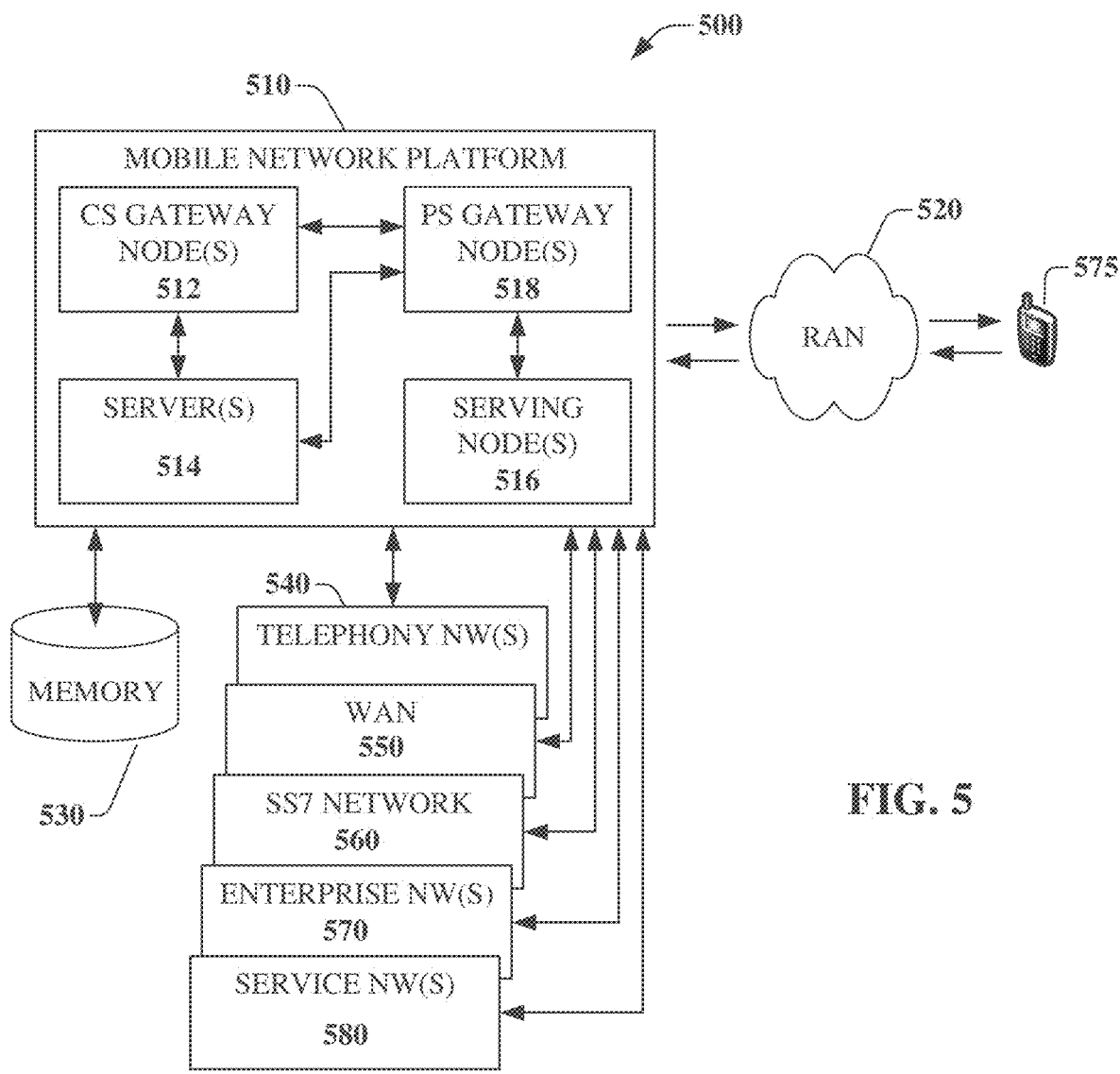
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part dynamic channelization of wireless communications such that one user of a group of users can automatically communicate bi-directionally with one or more other users that form a subset of the group. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
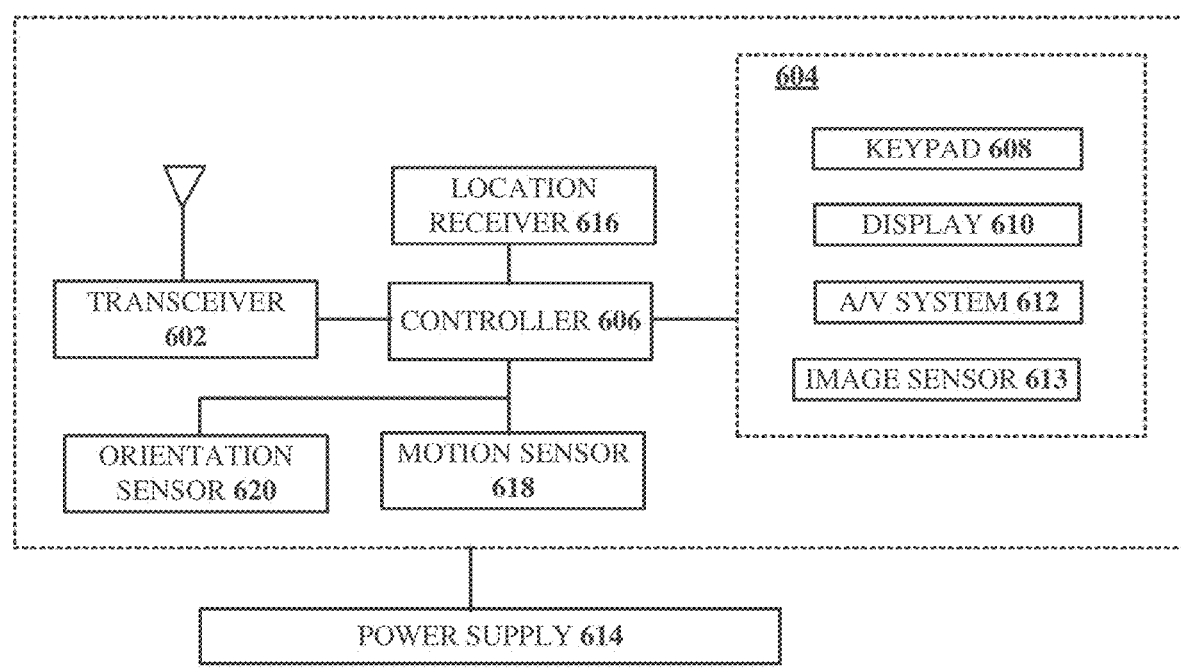
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part dynamic channelization of wireless communications such that one user of a group of users can automatically communicate bi-directionally with one or more other users that form a subset of the group.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically channelizing wireless communications such that one user of a group of users can automatically communicate bi-directionally with one or more other users that form a subset of the group) can employ various AI-based schemes for carrying out various embodiments thereof. Moreover, the classifier can be employed to determine a ranking or priority of each user and/or group of users. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which channel(s) to prioritize, which user(s) to prioritize, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An end-user device comprising:
   a processing system including a processor; and
   a memory that stores executable instructions that, when executed by the processing system, facilitate performance of operations, the operations comprising:
   storing for each other end-user device of a plurality of other end-user devices a respective identification, the end-user device and the plurality of other end-user devices forming a group;

receiving a first indication of a first subset of the group with which to carry out first communications, the first subset comprising first target end-user devices selected from the group;

responsive to receipt of the first indication, sending, via a common communication channel to each of the first target end-user devices, a first instruction, wherein the first instruction instructs the first target end-user devices to communicate with the end-user device via a first dynamically determined channel, wherein the common communication channel uses a first portion of wireless spectrum distinct from a second portion of the wireless spectrum used by the first dynamically determined channel; and engaging in the first communications via the first dynamically determined channel with each of the first target end-user devices after each of the first target end-user devices has tuned to the first dynamically determined channel.

2. The end-user device of claim 1, wherein the first indication is received via a microphone of the end-user device.

3. The end-user device of claim 2, wherein the first indication is received as audio speech from a user of the end-user device.

4. The end-user device of claim 3, wherein the sending is based at least in part upon a speech recognition process performed on the audio speech from the user of the end-user device.

5. The end-user device of claim 1, wherein the first dynamically determined channel is determined in real-time in response to receipt of the first indication.

6. The end-user device of claim 1, wherein:
the end-user device is capable of communicating via a predetermined range of wireless spectrum; and
the first dynamically determined channel is assigned less than all of the predetermined range of the wireless spectrum.

7. The end-user device of claim 6, wherein the first dynamically determined channel is assigned less than all of the predetermined range of the wireless spectrum by the end-user device.

8. The end-user device of claim 1, wherein the storing further comprises storing for each of the plurality of other end-user devices forming the group an indication of to which one of a plurality of sub-groups a corresponding end-user device belongs.

9. The end-user device of claim 1, wherein the first target end-user devices are a plurality of first target end-user devices.

10. The end-user device of claim 1, wherein each respective identification is sufficiently unique so as to distinguish the end-user device and each of the plurality of other end-user devices of the group from one another.

11. The end-user device of claim 1, wherein:
the storing comprises storing each respective identification in a storage element of the end-user device; and
the operations further comprise receiving each respective identification for storage in the storage element of the end-user device.

12. The end-user device of claim 1, wherein the operations further comprise:
receiving a second indication of a second subset of the group with which to carry out second communications, the second subset comprising one or more second target end-user devices selected from the group;

responsive to receipt of the second indication, sending to each of the one or more second target end-user devices a second instruction to communicate with the end-user device via a second dynamically determined channel; and engaging in the second communications with each of the one or more second target end-user devices after each of the one or more second target end-user devices has tuned to the second dynamically determined channel.

13. The end-user device of claim 12, wherein at least one of the second target end-user devices is a same device as one of the first target end-user devices.

14. The end-user device of claim 1, wherein each of the first target end-user devices simultaneously monitors the common communication channel and the first dynamically determined channel.

15. A non-transitory machine-readable medium comprising executable instructions that, when executed by a processing system of an end-user device including a processor, facilitate performance of operations, the operations comprising:

obtaining for each other end-user device of a plurality of other end-user devices respective identification information, the plurality of other end-user devices and the end-user device together forming a group;

obtaining first information indicating that one or more first end-user devices of the plurality of other end-user devices belongs to a first sub-group;

obtaining second information indicating that one or more second end-user devices of the plurality of other end-user devices belongs to a second sub-group;

receiving a first verbal command, the first verbal command indicating that first communications are to be carried out with the one or more first end-user devices of the first sub-group;

responsive to receipt of the first verbal command, transmitting, to each of the one or more first end-user devices of the first sub-group, third information, the third information directing each of the one or more first end-user devices of the first sub-group to communicate with the end-user device via a first portion of wireless spectrum that is dynamically assigned, the third information being transmitted to each of the one or more first end-user devices on a third portion of wireless spectrum distinct from the first portion of wireless spectrum;

receiving a second verbal command, the second verbal command indicating that second communications are to be carried out with the one or more second end-user devices of the second sub-group; and responsive to receipt of the second verbal command, transmitting, to each of the one or more second end-user devices of the second sub-group, fourth information, the fourth information directing each of the one or more second end-user devices of the second sub-group to communicate with the end-user device via a second portion of wireless spectrum that is dynamically assigned, the second portion of wireless spectrum being distinct from the first portion of wireless spectrum, the fourth information being transmitted to each of the one or more second end-user devices on a fourth portion of wireless spectrum distinct from the second portion of wireless spectrum.

16. The non-transitory machine-readable medium of claim 15, wherein the operations further comprise:
engaging in the first communications with each of the one or more first end-user devices of the first sub-group after each of the one or more first end-user devices of the first sub-group has enabled communication via the first portion of wireless spectrum; and engaging in the second communications with each of the one or more second end-user devices of the second sub-group after each of the one or more second end-user devices of the second sub-group has enabled communication via the second portion of wireless spectrum.

17. The non-transitory machine-readable medium of claim 16, wherein:

the transmitting of the third information is via spread spectrum;

the transmitting of the fourth information is via spread spectrum;

the engaging in the first communications is via spread spectrum;

the engaging in the second communications is via spread spectrum; or any combination thereof.

18. A method comprising:

obtaining, by a mobile device comprising a processing system including a processor, data indicating that one or more first transceivers of a plurality of transceivers belongs to a first sub-group and that one or more second transceivers of the plurality of transceivers belongs to a second sub-group;

responsive to receipt of a first command from a user of the mobile device, transmitting by the processing system to each transceiver of the first sub-group a first communication instruction, the first communication instruction directing each transceiver of the first sub-group to communicate with the mobile device via a first portion of wireless spectrum that is dynamically assigned, the first communication instruction being transmitted to each of the first sub-group on a third portion of wireless spectrum distinct from the first portion of wireless spectrum;

responsive to receipt of a second command from the user of the mobile device, transmitting by the processing system to each transceiver of the second sub-group a second communication instruction, the second communication instruction directing each transceiver of the second sub-group to communicate with the mobile device via a second portion of wireless spectrum that is dynamically assigned, the second communication instruction being transmitted to each of the first sub-group on a fourth portion of wireless spectrum distinct from the second portion of wireless spectrum the second portion of wireless spectrum being distinct from the first portion of wireless spectrum;

engaging in first communications with each transceiver of the first sub-group after each transceiver of the first sub-group has enabled communication via the first portion of wireless spectrum; and engaging in second communications with each transceiver of the second sub-group after each transceiver of the second sub-group has enabled communication via the second portion of wireless spectrum.

19. The method of claim 18, wherein:

the mobile device comprises a transceiver;

each transceiver of the first sub-group is configured to transmit back to the mobile device a respective first confirmation that the respective first communication instruction has been received;

each transceiver of the second sub-group is configured to transmit back to the mobile device a respective second confirmation that the respective second communication instruction has been received;

each transceiver of the first sub-group is configured to transmit back to the mobile device a respective third confirmation that a first communication has been output in audio form to each respective user; and each transceiver of the second sub-group is configured to transmit back to the mobile device a respective fourth confirmation that a second communication has been output in audio form to each respective user.

20. The method of claim 18, wherein each transceiver of the first sub-group is configured to simultaneously monitor the first portion of the wireless spectrum and the third portion of the wireless spectrum, and wherein each transceiver of the second sub-group is configured to simultaneously monitor the second portion of the wireless spectrum and the fourth portion of the wireless spectrum.

* * * * *